July 26, 1938. A. O. SCHAEFER 2,124,592
TOOL GRINDER
Filed July 24, 1936 4 Sheets-Sheet 1

INVENTOR.
Adolph O. Schaefer
ATTORNEYS.

July 26, 1938.  A. O. SCHAEFER  2,124,592
TOOL GRINDER
Filed July 24, 1936  4 Sheets-Sheet 3
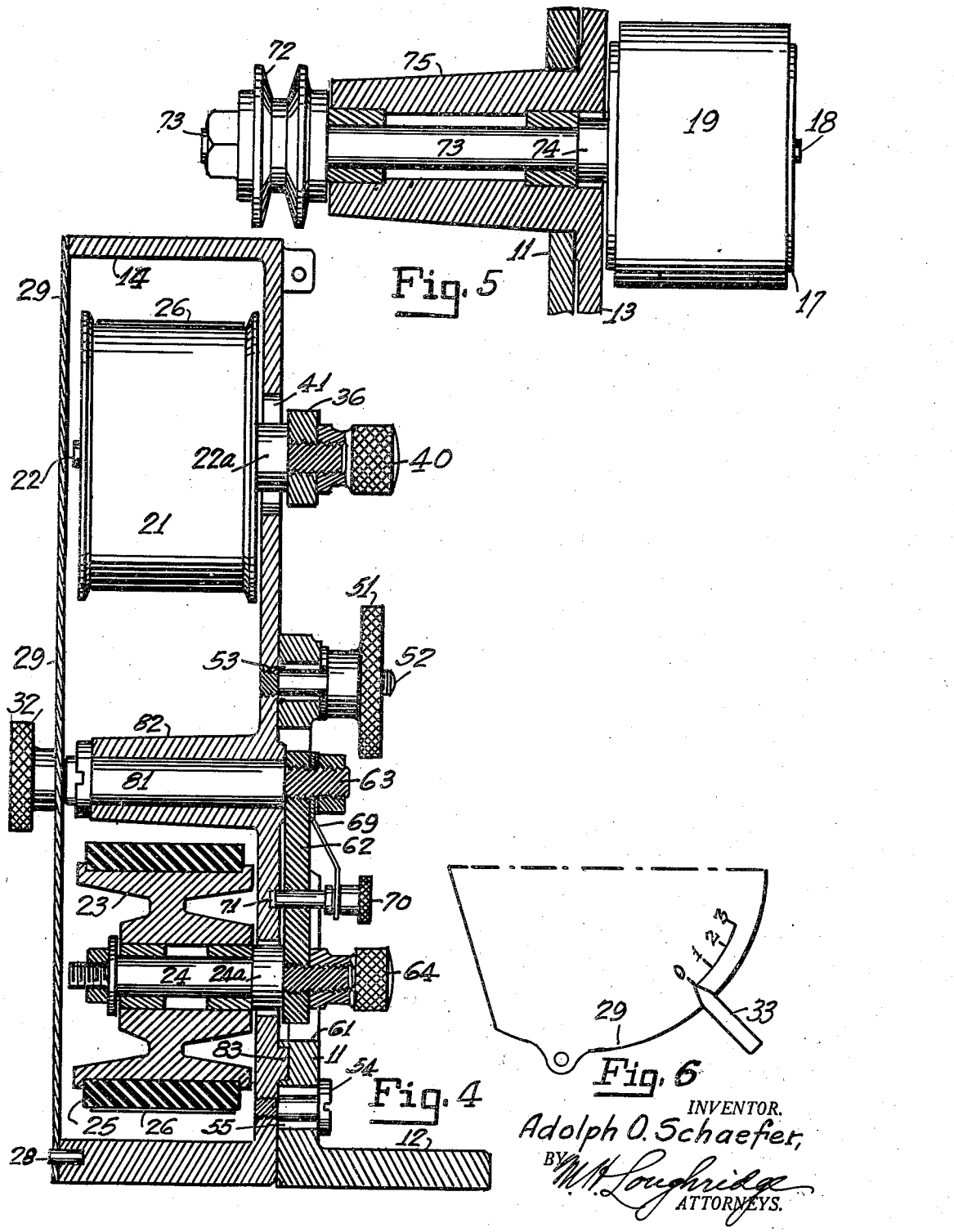
INVENTOR.
Adolph O. Schaefer,
BY
ATTORNEYS.

July 26, 1938. A. O. SCHAEFER 2,124,592
TOOL GRINDER
Filed July 24, 1936 4 Sheets-Sheet 4

INVENTOR.
Adolph O. Schaefer,
BY
ATTORNEY.

Patented July 26, 1938

2,124,592

UNITED STATES PATENT OFFICE 2,124,592

TOOL GRINDER

Adolph O. Schaefer, Brooklyn, N. Y., assignor to Atlantic Service Company, Inc., Brooklyn, N. Y., a corporation of New York Application July 24, 1936, Serial No. 92,272

4 Claims. (Cl. 51—140)

This invention relates to a tool sharpener or to machines for sharpening or polishing tools and the like and it has for an object to provide a machine of the abrasive belt type which is compact, in which the moving parts are all enclosed, which is adjustable for work of different sizes and shapes and which will polish a surface or grind a fine edge on both sides of the tool.

The machine comprises a base plate upon which a pair of frames are pivotally mounted and are angularly adjustable relative to each other. These frames form a housing for the belt pulleys and the abrasive belts so that no part of the moving mechanism is exposed except the portion of the belt that is used for polishing. The belts are driven in the same direction and at the same speed by the frictional engagement of a pair of pulleys carrying the belts and one of these pulleys is driven by a motor or other source of power.

The frames are inclined at an angle to each other with the lower pulleys of each frame in contact. This brings the belts in contact with each other and the tool to be sharpened is inserted between the belts so that it is ground on both sides and it is ground to an edge that, theoretically, tapers off to infinity as it approaches the point of contact of the rollers. The rollers are held in engagement by the action of a spring and the rollers themselves have a tire of rubber which is relatively soft and yielding. The rubber tired pulley or roller makes the friction drive practical and it provides the driving friction for the abrasive belts. Other objects of the invention reside in the construction of the apparatus and the arrangement of the parts as more fully described in the following specification and illustrated in the accompanying drawings, in which Fig. 1 is a vertical elevation of the machine from the front with the covers of each frame removed;

Fig. 4 is a vertical cross section on the line 4—4 of Fig. 3;

Fig. 5 is a vertical section through the base and frame on line 5—5 of Fig. 3;

Fig. 6 is an indexing arrangement applied to the front cover to indicate the angular deflection of the frame;

Figures 1, 2:
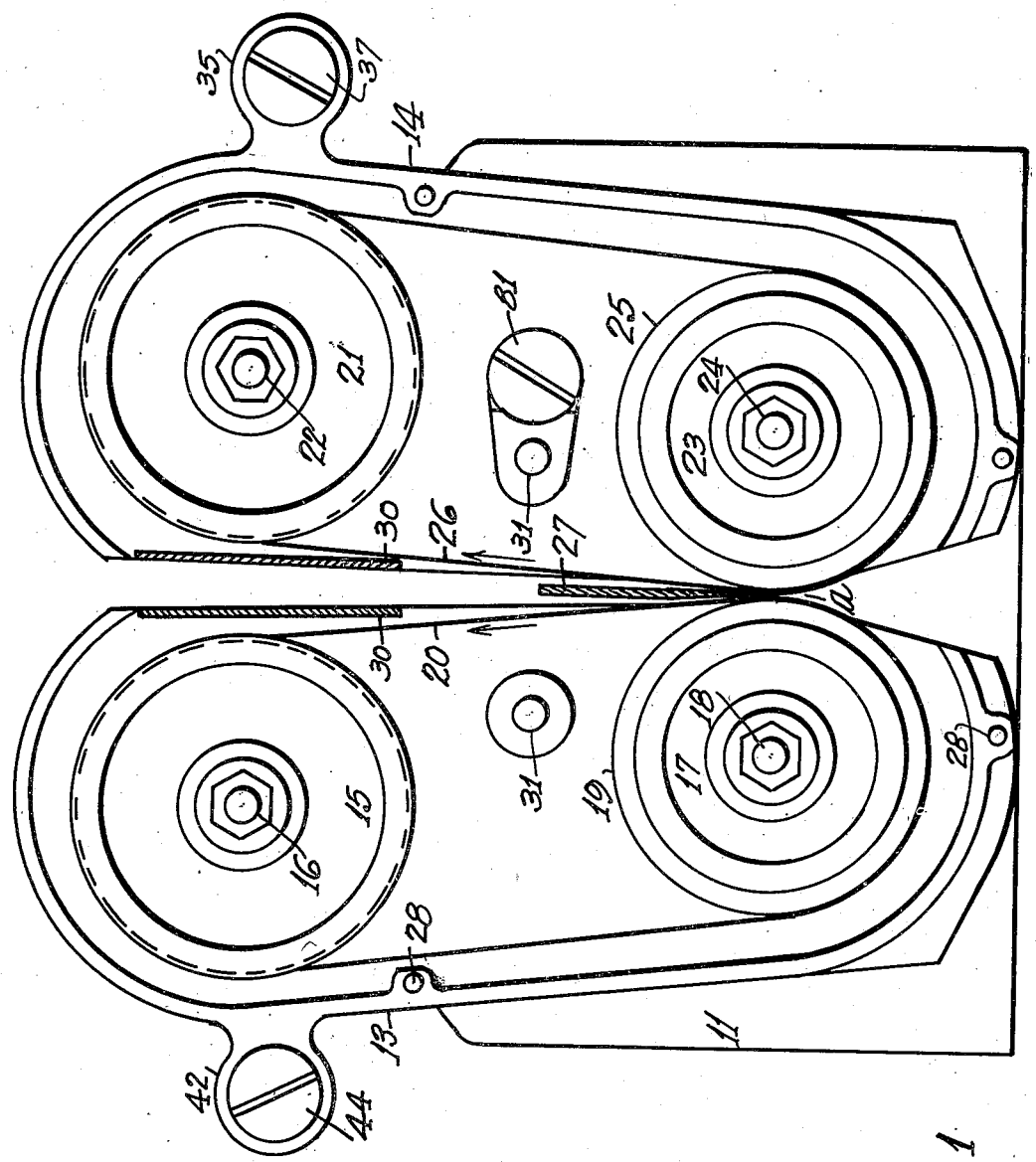
Fig. 2 is a view of part of the cover for one of the frames.

In the drawings 11 is a vertical base plate which is provided with a horizontal leg at 12 to act as a stand. 13 is one of the frames and 14 is the other frame which are mounted side by side against the base 11 as hereafter described. The frame 13 has an upper pulley 15, mounted on the shaft 16 and the lower pulley 17, mounted on the shaft 18 and provided with a rubber tire or tread 19. On this pair of pulleys the abrasive belt 20 is mounted. The structure of frame 14 corresponds with frame 13 with the pulley 21 mounted on shaft 22 at the top and pulley 23 having the rubber tire 25, mounted on shaft 24 at the bottom and with the abrasive belt 26 mounted on this pair of pulleys. Each frame is provided with a cover 29 which is secured by the knurled nut 32, Fig. 4, on the stem 31 and by the dowels 28. Each cover has a bent over wing 30, shown in section in Fig. 1 which encloses the belt opposite the upper pulleys and exposes the face of each belt below these pulleys down to the engaging point of the lower pulleys at a. In this arrangement it will be noted that the pulleys and the abrasive belts are completely enclosed by the hollow frame and the cover therefor except the grinding portion of the belts and the operator is protected in using the machine. The hollow frames are readily removable from the base.

Figure 7:
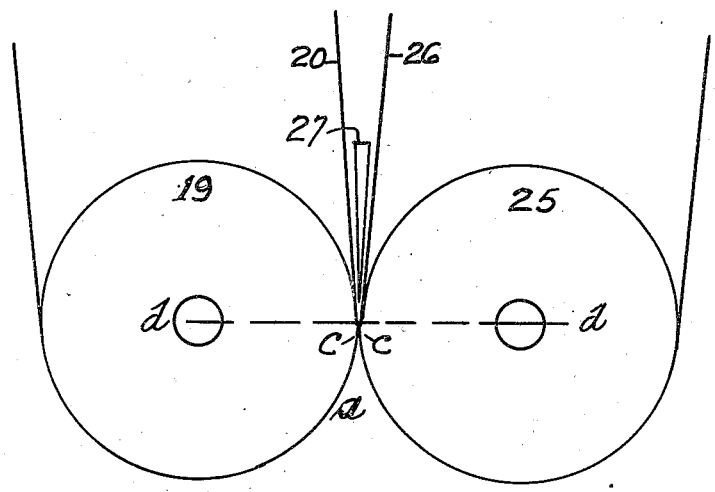
Fig. 7 is a diagram showing the engagement of the rubber tired rollers with relation to the edge of the tool to be sharpened.

The tool to be sharpened or polished is indicated at 27, Figs. 1 and 7 and is drawn back and forth across the face of the moving belts during the operation. This sharpens each side of the blade or knife to the same extent.

Figure 3:
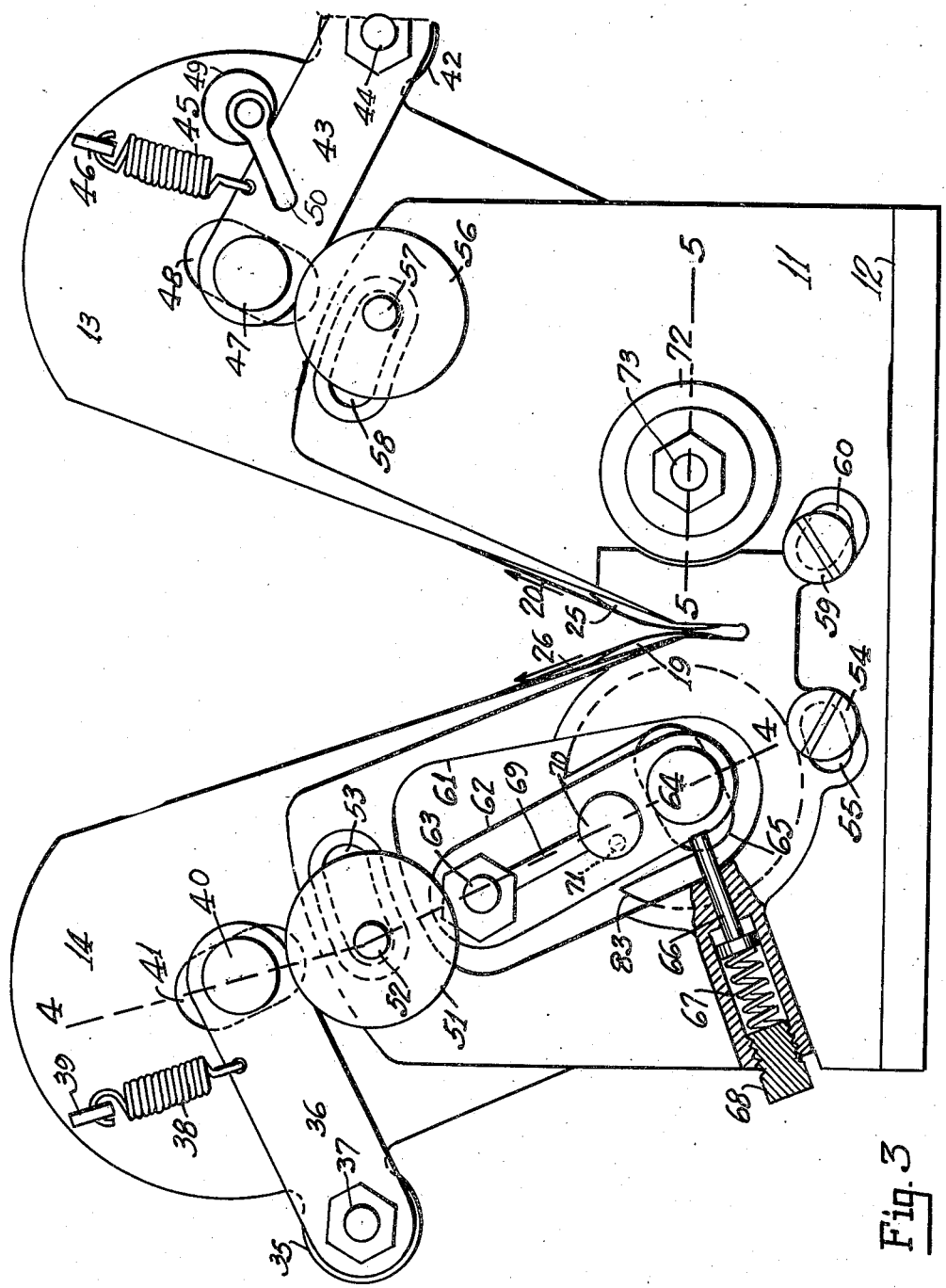
Fig. 3 is a rear elevation of the machine complete with certain parts sectioned.

A lug 35 is provided on frame 14, Fig. 3, to which the arm 36 is pivoted by the stud 37. This arm is moved upwards by a bias due to spring 38 connected to the fixed lug 39 on the frame 14. The arm 36 has screwed therein the stem of shaft 22 which carries the pulley 21 and this stem is locked against the collar 22a on shaft 22 by the knurled nut 40. The collar 22a moves vertically in the slot 41 in the frame 14.

By this arrangement it will be noted that the spring 38 applies and maintains tension on the abrasive belt 26 and by pressing the knob 40 downward the tension is released and the belt may be removed.

The construction of frame 13 corresponds with frame 14 just described in which the arm 43 is pivoted at 44 to the lug 42 and is biased upwards by the spring 45 engaging the lug 46. The knob 47 is attached to the shaft 16 of the upper pulley 15 and through the slot 48 enables this pulley to be raised or lowered as desired. The cam 49 and lever 50 may be used for this purpose.

The frame 14 is secured to the base 11 by means of the stud 52 which passes through the slot 53 and is locked in position by the knurled nut 51. The frame is also secured to the base at the lower end, through the stud 54 in the slot 55 engaging the frame 14. The frame 13 is similarly secured to the base 11 by the stud 57 in the slot 58 engaged by the nut 56 and by the stud 59 in slot 60. The slots 53 and 55 are arcuate shaped and are centered about the pivot of the frame; also the slots 58 and 60 are arcuate shaped centered about the pivot of frame 13.

An aperture is made in the base 11 at 61 exposing the frame 14 upon which the arm 62 is mounted by the stud 63 of the stem 81 in the boss 82, Fig. 4. The lower end of arm 62 has screwed therein the stem of shaft 24 upon which the roller 23 is mounted. This stem has a collar 24a engaging arm 62 on one side and the knurled nut 64 engaging the arm on the opposite side. The collar 24a is free to move in the slot 65 as the arm 62 is moved on the stem 81. This adjusts the pulley wheel 23 relative to frame 14 and to the pulley 17. Normally a bias is applied to arm 62 to hold the pulley 23 in engagement with 17 by the plunger 66 and spring 67 engaging the screw plug 68 in the base 11. It is necessary to disengage the pulleys 17 and 23 when the belts are being changed, or it may be necessary to disengage them if one abrasive belt only is used. For this purpose a latch is provided for arm 62 which holds it in the position in which the pulleys are disengaged and against the action of spring 67. This comprises the plunger 70 engaging an aperture 71 in the frame 14 when the arm 62 is moved to the disengaged position. A flat spring 69 forces the plunger 70 into the latching notch in 14. When the plunger 70 is released the engagement of pulleys 17 and 23 is restored. It should be noted that the arm 62 moves at both ends relative to the base 11. If the aperture 61 were not provided in the base two slots would be required to permit this movement. The aperture 61 enables the arm to be placed against the frame and flush with the base 11. This shortens the stud connections to the arm and the base 11 protects it against accidental movement.

The frames 13 and 14 are pivotally mounted on the base plate 11 so that they pivot about the axis of the rollers 17 and 23 and may be brought close together as indicated in Fig. 1 or they may be spread apart as indicated in Fig. 3, but in each case the relation of the rollers 17 and 23 to each other is not changed. This construction is provided for by a socket formed in the base 11 on the axial line of the rollers 17 and 24 and by a stem on each frame matching with the corresponding socket and upon which the frames are maintained in alignment to each other.

Fig. 5 illustrates the drive in the socket and stem arrangement for the frame 13 from which it will be noted that the frame is provided with a hollow stem 75 passing through a socket or aperture in the base 11 and by means of which the frame 13 may be rotated on its support 11, the extent of the rotation is determined by the slots 58 and 60 and the frame is locked in the desired position by the nut 56. The drive is obtained through the grooved pulley 72, mounted on shaft 73, in the hollow stem 75, which is provided with the collar 74 against which the pulley 19 is mounted on shaft 18.

The stem of frame 14, Figs. 3 and 4, comprises a circular ledge 83 arranged to engage a matched socket or groove in the base 11 and upon which the frame 14 is pivotally adjusted. It will be noted that this socket arrangement leaves the shaft 24 of the pulley 23 free to be adjusted in the slot 65 while the frame may be rotated to any position. Both the frames can readily be adjusted to the same angular position on the base by the use of the index, Fig. 6, in which index characters are provided on the cover 29 to register with the fixed index pointer 33.

In the pivotal mounting of the rollers and the frames in the base 11, it will be observed that the stud bearings of the rollers leave their ends open so that the belts can be replaced without taking the mechanism apart; also that a frame may be removed with its contents by releasing the screws 51 and 54, and each roller may be removed by itself. Removal of the rollers from the hollow stem 75 or the bearing 83 does not interfere with the pivotal movement of the frames.

The advantage in using tires of rubber or yieldable material on the pulleys which are brought into engagement with each other will be understood from Fig. 7. The line $d—d$ joining the centers of these pulleys is the point where the belts are brought into contact and is the vanishing point of the edge of the tool 27. When the tool is approaching this point the rubber is compressed but below this point the rubber is free to expand as at $c—c$ thereby providing a contacting surface which maintains the drive by friction from one pulley to the other. If the surface of the pulleys did not yield in this way it would be impossible to bring the edge as close to the line $c—c$ as it is with the rubber tired pulleys because the driving friction of the driven pulley would be removed.

Figure 8:
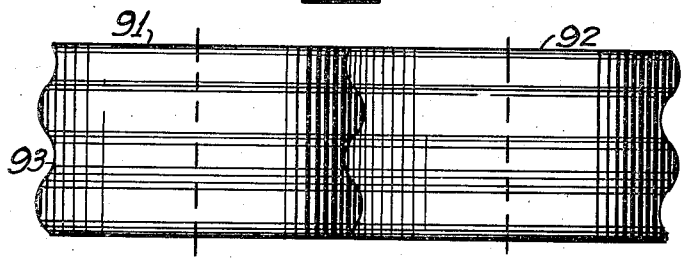
Fig. 8 is a plan view of a pair of rollers made with matched corrugated faces that may be used for driving the abrasive belts.
Figure 9:
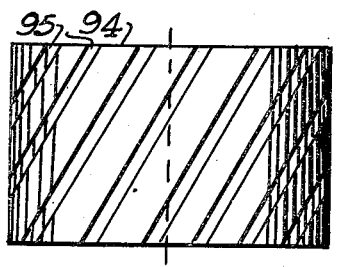
Fig. 9 is another form of roller provided with spiral grooves on its face.

In Fig. 8 the rollers 91 and 92 are substituted for the rollers 19 and 25. The surface of these rollers is provided with matched grooves or corrugations as indicated at 93 and which provide corresponding grooves in the abrasive belts. The tool to be sharpened is drawn transversely across the belt but it will be noted that on one side one portion of the edge is being ground while on the opposite side another portion of the edge, not opposite the first portion, is being ground. This avoids overheating the edge of the tool in the grinding operation and avoids impairing its temper. Another form of friction roller is indicated in Fig. 9 that may be substituted for rollers 19 and 25. The surface of this roller is provided with a series of spiral grooves 95 which increase the air circulation where the abrasive belt engages the roller and assists in dissipating the heat.

This invention may be applied in a variety of forms in addition to that shown in the drawings and it may be adapted for polishing, grinding or other abrasive work.

The structure of the invention may be used as shown, or its component parts may be used in other forms of grinding machines and in machines with other types of drive.

Having thus described my invention, I claim:

1. In a tool grinder, a single base plate having a pair of spaced sockets and an aperture centered in one of said sockets, a pair of frames pivotally supported solely by said base plate through said sockets, a pair of pulleys in each frame and an abrasive belt mounted on each pair of pulleys for engaging the work at the same time, an arm pivoted to the frame opposite the aperture and exposed through the aperture, a shaft for one of said pulleys extending through a slot in the frame opposite the aperture and supported by said arm and a spring forcing said arm into the grinding position relative to the other frame.

2. In a tool grinder, a frame with a pair of rollers having grooves in their surface, a second frame with a pair of rollers having ridges to match the grooves of the first rollers, an abrasive belt mounted on and conforming to the grooves of each pair of rollers, said belts being angularly disposed and arranged to meet opposite said rollers, the tool being passed between the belts and said rollers.

3. A tool grinder comprising a base plate having a pair of spaced apertures therein and an arcuate slot centered about each of said apertures, a pair of frames, each comprising a housing for a pair of spaced pulleys and an abrasive belt mounted on each pair of pulleys, each of said housings having a hollow stem pivotally mounted in said apertures against said base plate, one of the pulleys of each frame having a shaft centered on the hollow stem of the pivotal mounting, means for clamping each frame through said arcuate slots against said base plate, said frames being open where they face each other to expose the belts to the tool, the shaft of one of said pulleys projecting through the stem and the frame and means for driving said shaft.

4. A tool grinder comprising a single base plate having a pivotal aperture therein and an arcuate slot, a frame supporting a pair of rollers and an abrasive belt mounted on said rollers, means pivotally securing said frame by a clamp in said arcuate slot to said base plate with the pivot centered in said aperture, said frame being supported solely by said base plate, a shaft for one of said rollers located in a slot in said frame opposite the pivotal aperture of the base plate, an arm pivoted to said frame and supporting said shaft at its free end and a spring engaging said arm to force the belt into the grinding position.

ADOLPH O. SCHAEFER.